United States Patent
Liu et al.

(10) Patent No.: US 10,366,711 B1
(45) Date of Patent: Jul. 30, 2019

(54) APPLYING A PRE-ERASE OR PRE-CONDITION FIELD TO A HARD DISK BEFORE WRITING DATA TO THE HARD DISK

(71) Applicant: Seagate Technology, Cupertino, CA (US)

(72) Inventors: Yanzhang Liu, Eden Prairie, MN (US); Javier Ignacio Guzman, Minneapolis, MN (US); Zuxuan Lin, Maple Grove, MN (US); Kirill Aleksandrovich Rivkin, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/032,741

(22) Filed: Jul. 11, 2018

(51) Int. Cl.
*G11B 20/18* (2006.01)
*G11B 5/024* (2006.01)
*G11B 19/04* (2006.01)
*G11B 9/14* (2006.01)
*G11B 5/00* (2006.01)

(52) U.S. Cl.
CPC ............ *G11B 5/024* (2013.01); *G11B 9/1409* (2013.01); *G11B 19/041* (2013.01); *G11B 2005/0013* (2013.01); *G11B 2209/02* (2013.01); *G11B 2220/2508* (2013.01)

(58) Field of Classification Search
CPC ....... G11B 5/024; G11B 5/02; G11B 5/59627; G11B 5/012; G11B 20/10203; G11B 2020/10851; G11B 20/18; G11B 20/14; G11B 27/36; G11B 5/00; G11B 5/865

USPC ......... 360/17, 39, 57, 43, 66, 75, 51, 62, 53
See application file for complete search history.

(56) References Cited

U.S. PATENT DOCUMENTS

| | | | |
|---|---|---|---|
| 4,851,933 A | 7/1989 | Sugaya et al. | |
| 6,351,340 B2 * | 2/2002 | Dixon | G11B 5/012 360/46 |
| 6,791,774 B1 * | 9/2004 | Albrecht | B82Y 10/00 360/17 |
| 6,813,106 B1 * | 11/2004 | Mallary | G11B 5/865 360/17 |
| 7,079,345 B1 * | 7/2006 | Nguy | G11B 5/0245 335/209 |
| 7,256,962 B2 * | 8/2007 | Tateishi | G11B 5/2657 360/118 |
| 7,667,915 B2 * | 2/2010 | Abe | G11B 5/09 360/51 |
| 7,701,655 B2 * | 4/2010 | Fujita | G11B 5/584 360/49 |
| 7,920,351 B2 * | 4/2011 | Cho | G11B 5/024 360/57 |
| 9,117,463 B1 * | 8/2015 | Tang | G11B 5/024 |
| 9,595,279 B1 * | 3/2017 | Martin | G11B 5/6029 |
| 2005/0182951 A1 | 8/2005 | Sohn | |
| 2006/0227446 A1 | 10/2006 | Elliott et al. | |

* cited by examiner

*Primary Examiner* — Nabil Z Hindi
(74) *Attorney, Agent, or Firm* — Hollingsworth Davis, LLC

(57) ABSTRACT

A pattern is pre-written using a pre-erase or pre-conditioning magnetic field applied within at least part of a target track of a hard disk via a first write transducer prior to the target track being written. Subsequent to the pre-writing, target user data is written to the part of the target track.

21 Claims, 6 Drawing Sheets

Disk pre-erase or pre-conditioning events
| Stage | Event | |
|---|---|---|
| Manufacturing | Pre-assembly | ~101 |
| 100 | Post-assembly | ~102 |
| In-Use | Power up | ~105 |
| 104 | Idle time | ~106 |
| | Enter power saving mode | ~107 |
| | With write command | ~108 |
| | Direct offline scan | ~109 |
*FIG. 1*
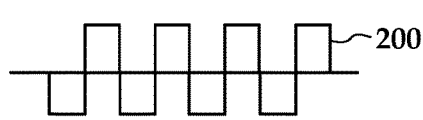
*FIG. 2*
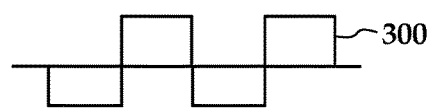
*FIG. 3*
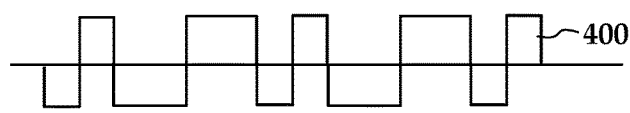
*FIG. 4*

APPLYING A PRE-ERASE OR PRE-CONDITION FIELD TO A HARD DISK BEFORE WRITING DATA TO THE HARD DISK

SUMMARY

Various embodiments described herein are generally directed to applying a pre-erase or pre-condition field to a hard disk before writing data to the hard disk. In one embodiment, a pattern is pre-written using a pre-erase or pre-conditioning magnetic field applied within at least part of a target track of a hard disk via a first write transducer prior to the target track being written. Subsequent to the pre-writing, target user data is written to the part of the target track.

In another embodiment, a write command to write target user data to a target track of a hard disk is received. A pattern is pre-written using a pre-erase or pre-conditioning magnetic field applied to an adjacent track proximate the target track via a first write transducer prior to the target track being written. Subsequent to the pre-writing, the target user data is written to the part of the target track.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 1 is a diagram illustrating stages in which erasure or pre-conditioning of a disk media may occur according to example embodiments;

FIGS. 2, 3, and 4 are simplified signal diagrams of pre-erase or pre-conditioning signals according to example embodiments;

DETAILED DESCRIPTION

Figure 5:
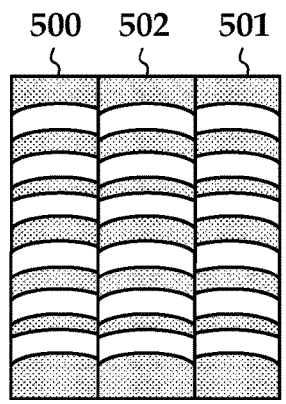
FIG. 5 is a diagram showing pre-conditioning applied to adjacent tracks according to an example embodiment.

The present disclosure generally relates to data storage devices that utilize magnetic storage media, e.g., hard disks. Recording schemes have been developed to increase areal density for conventional magnetic recording (CMR) devices, e.g., perpendicular magnetic recording (PMR) as well as devices using newer technologies, such as heat-assisted magnetic recording (HAMR) and microwave-assisted magnetic recording (MAMR). These new technologies allow data to be written in ever-narrower tracks thus increasing the amount of data stored in a unit of area, also referred to as areal density.

In today's hard drives, a direct overwrite method is used for writing of new data. In a direct overwrite arrangement, new data is written directly over old or logically erased data. However, it has been established that the quality of newly written data can depend on the magnetization state of the media that existed prior to the writing. Heads with weaker write fields (such as due to narrow pole width, higher clearance, etc.) can be significantly affected by the underlying magnetization state of the media. In future products, areal density, which is a function of the track density times the linear bit density, will continue to increase. A higher track density means narrower track widths. One way of achieving narrower track widths is to narrow the writer pole widths of the read/write head, which may result in a reduction of the applied magnetic field. One way of increasing magnetic field in a smaller write pole is to reduce the head/media spacing. However, it is not expected that head/media spacing can decrease proportional to the expected decrease in track width needed for future areal density targets, so it is expected that an increasing proportion of the head population will have difficulty writing over previously written data.

In the present disclosure, apparatuses and methods are described that can mitigate poor writeability of "weak" writers in a hard disk drive. For example, a drive may be configured to pre-condition or pre-erase a track (e.g., with an AC erase field) prior to writing new data. This method may involve two-pass writing, which can impact write throughput. Additional features are described that may reduce impact to write performance when using write pre-conditioning or pre-erase.

Implementations described herein improves the writeability, signal-to-noise ratio (SNR) and erasure metrics associated with a data track by pre-erasing data or pre-conditioning a selected track or band of tracks. For purposes of this disclosure, when only one of the "pre-erase" and "pre-condition" terms is used, it will be understood both terms may apply to the operation unless otherwise indicated. The pre-erase operations generally involve using the drives read/write head to apply an alternating current (AC), high frequency erase pattern, although other devices may be used, e.g., in the factory. The pre-conditioning operations generally involve using a pattern that is not typically used for erasure, such as a non-pure tone, random data, copy of the target data, etc. Note that user data previously written to the track is not considered pre-conditioning.

The pre-erase or pre-condition operations generally reduce the magnetization field produced by the existing data, however certain schemes can be considered which boost specific polarity of the writing. The term "pre-erase" may suggest that the previously existing data cannot be recovered and therefore may use a higher magnetic field than pre-conditioning. While the pre-erase and preconditioning will typically make previously recorded data unrecoverable, for purpose of this disclosure, it is not required that the previously written data cannot be recovered after pre-erasure or pre-conditioning, only that the previous magnetization fields are reduced.

In FIG. 1, a diagram illustrates stages of the drive's life cycle during which a pre-erasure may occur according to an example embodiment. As indicated by blocks 100-102, pre-erasing or pre-conditioning, of the disk can be performed at the factory. As indicated by blocks 101, 102, this may occur prior to assembly of the disks into the drive (e.g., via a spin stand) or after drive assembly. As an example of the latter, the pre-erasure may occur at the end of the drive factory certification process before it is shipped to the customer.

As indicated by blocks 104-109, the pre-erase can also be performed during field use of the disk drive. In the field, pre-erasing can be performed during the time when a hard drive is not currently being heavily used by the host. One event which can trigger pre-erase of particular portions is when the drive is powered on but is not being accessed for data as indicated by block 105. Other events which may trigger a pre-erasure include when the drive is idle or preparing to enter a power saving mode indicated by blocks 106-107. During these events 105-107, the impacts to write throughput can be mitigated, as the drive is not currently being written to by the host.

Blocks 108 and 109 represent events that can trigger a scan that may affect drive throughput or response. Block 108 indicates a pre-erase to sectors that occurs immediately or soon before writing to those sectors occurs. This can have a impact on write performance, although certain drive architectures may have features that can minimize the impact. Block 109 indicates a pre-erase that occurs in combination with a direct offline scan (DOS) procedure, which involves rewriting tracks for the purpose of preventing erasure-caused events, e.g., due to adjacent track interference. As the direct offline scan already operates at times designed to minimize impact to system performance, performing pre-erase with DOS may reduce impacts to write throughput.

The pre-erase operations can involve a plurality of tracks, one track, or part of a track, including individual sectors. Regions targeted for individual pre-erase operations can be purposely kept small so that the pre-erase can be handled gradually during normal operations. For example, a running queue of sectors or tracks targeted for pre-erase may be maintained as a set of low-priority write commands, and be performed when convenient, e.g., when the head is traversing nearby and no high priority operations are currently pended.

The pre-erase operations can be confined only to specific portions of the disk. For example, pre-erase may be performed on cylinders where writeability concerns are highest, or used with the weakest (e.g., narrowest) heads in order to improve yields. Pre-erase could be initially turned off, and then turned on when there are indications that a given head has lost some writeability. This can prevent a drive failure at the expense of the overhead in handling the pre-erase operations.

Generally, conventional hard drives may not track whether or not a particular data sector has been previously written to. A host computer that uses the hard drive generally tracks the data using filesystem structures, which, among other things, specify at which logical block addresses (LBAs) data of files are stored, and track free space. To delete a file or other data, the operating system typically changes metadata on the disk that specifies LBAs formerly used by the file are now free, while leaving the actual data in the file intact. When those LBAs are used again, the operating system instructs the disk to write over this old data. Thus a conventional drive may not have any indication whether data at a particular LBA is in currently in use or previously written to by the host. The drive controller may collect some statistics regarding write activity, e.g., to detect repeated write activity that may cause data loss such as interference with adjacent track data. However, a conventional hard drive generally does not perform any pre-erase or pre-conditioning before writing user data in normal operation.

In some embodiments herein, a hard disk drive may track whether or not particular sectors have been written to. In such a case, such sectors may be marked as 'dirty', meaning they will be erased before being written to again. In order to facilitate background pre-erase, the drive may also utilize other information (e.g., filesystem metadata) that indicates regions that have been deleted by the host operating system such that the deleted regions can be pre-erased in the background. In other embodiments, a hard disk drive can use a map of LBAs to physical addresses (e.g., sectors) and instead of erasing a target sector just before overwriting, writing the data to an already erased location and changing the logical-to-physical mapping.

Generally, pre-erase or precondition involves applying a known magnetic field pattern via a write transducer. This pattern is defined by an electrical signal applied to the transducer as the disk moves underneath it. As indicated in FIGS. 2 and 3, a high frequency erase according to an example embodiment may use a pure AC signal, e.g., 1T signal 200 and/or 2T signal 300. Instead of pure, single-tone, AC erase, a multi-tone pattern 400 as shown in FIG. 4 can be used in some embodiments. This pattern 400 is a repetition of a first 1T cycle followed a second 2T cycle. This can be extended to any pattern, e.g., random or pseudo-random. Note that the actual waveforms applied to the write transducer may be more complex that those shown in FIGS. 2-4. For example, the preamplifier may add overshoots and/or other signal features to compensate for the channel response and magnetic interactions between the write pole and the recording media.

In some embodiments, the system controller can choose to pre-write a pattern, e.g., to adjacent tracks proximate the target track, designed to specifically compensate the demagnetization effects produced by a more exact representation of the data to be written. An example of adjacent track compensation according to an example embodiment is shown in the diagram of FIG. 5. In this diagram, track 502 is the target track, and is surrounded by adjacent tracks 500, 501 on either side. One or both of adjacent tracks 500, 501 can be written with a copy of the target user data, such that the field from the neighboring tracks 500, 501 boosts each bit of the user data to be written to the target track 502. Such procedure may be more effective where the recording system has a synchronization capability such that bit boundaries between adjacent tracks can be aligned. Even if precise synchronization between adjacent track bits cannot be guaranteed, such a technique may still be adapted to produce some benefits. For example, a combination of short and long bits can be written on a neighboring track with the long bits being opposite to the dominant magnetization of the given data segments. In this way, the adjacent track writing can boost (on average) the remanence of this dominant magnetization, while simultaneously reducing the next track erasure.

Figure 6:
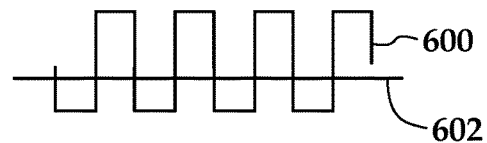
FIG. 6 is a diagram of a pre-erase or pre-conditioning signal according to another example embodiment.

Pre-written magnetization can be dominated by a given polarity. For example, if is known that there is a substantial write field or rise time asymmetry for a given head, the effects can be compensated for by track erasure or preconditioning. The impact might be higher in case of energy-assisted recording (HAMR, MAMR). For example, the spin-torque oscillator (STO) used for MAMR recording can have somewhat asymmetric amplitudes of oscillations. Writers used in HAMR, which typically use a laser to heat the recording medium, can exhibit a significant rise time asymmetry. As seen by the graph in FIG. 6, an erase signal 600 used for target track or adjacent track erasure according to an example embodiment may be asymmetric about zero current 602. This asymmetry is designed to induce an asymmetric magnetic field at the write transducer, e.g., where the applied field is stronger in one field direction than the opposing field direction.

In the embodiments described above, target track and/or adjacent track pre-erasure or pre-conditioning and subsequent writing to the target track may be performed via two passes of a single write transducer, e.g., conventional or energy-assisted write pole that is coupled to a write coil. In other embodiments, a parallelism feature may assist in performing the pre-erasure or pre-conditioning and subsequent writing in less than two passes.

Figure 7:
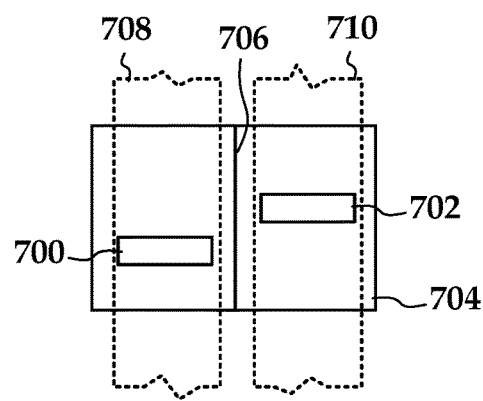
FIGS. 7, 8, and 9 are diagrams of multiple-write transducer heads or head gimbal assemblies according to example embodiments.

A parallel write arrangement according to an example embodiment is shown in the diagram of FIG. 7. Two independently operable write transducers 700, 702 are mounted to a common structure 704 that is moved across a disk via an arm or similar actuator. The common structure 704 may include a single head in which the write transducers 700, 702 are manufactured, e.g., via wafer deposition. As indicated by line 706, the common structure 704 may be a head/gimbal assembly that includes two heads or head subassemblies joined together. Note that in this and other similar examples, the relative position of the write transducers 700, 702 may be adjustable either via microactuators built into a single head (e.g., a heater that cause thermal expansion) or via microactuators (e.g., piezoelectric elements) that separately move multiple heads on the same head-gimbal assembly.

The write transducers 700, 702 can be positioned over adjacent tracks 708, 710. For this example it is assumed that the structure advances from left to right during a write event such that track 708 is the current track being written and track 710 is the next track to be written. While transducer 700 is writing the current track 708 transducer 702 is erasing the next track 710. This assumes the next track 710 is targeted for writing as part of this write event, although if there is no currently utilized user data written to the next track 710, then it may be erased anyway.

Figure 8:
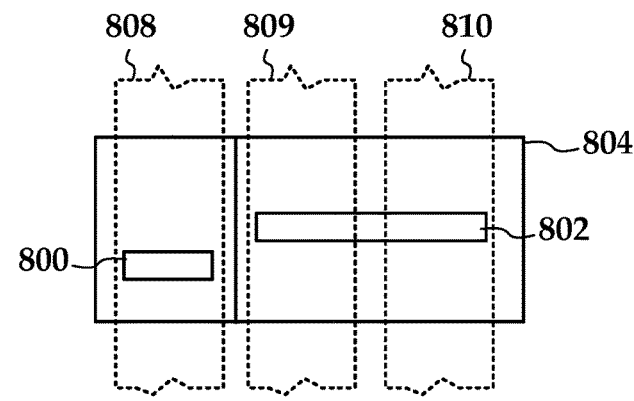

A parallel write arrangement according to another example embodiment is shown in the diagram of FIG. 8. Two independently operable write transducers 800, 802 are mounted to a common structure 804 that is moved across a disk via an arm or similar actuator. As with the previous example, the common structure 804 may include a single head or head/gimbal assembly that includes, e.g., two heads joined together. The write transducers 800, 802 can be positioned over adjacent tracks 808-810. Because write transducer 802 has a width that covers multiple tracks, it can erase two next tracks 809-810 while the current track 808 is being written by write transducer 800.

Figure 9:
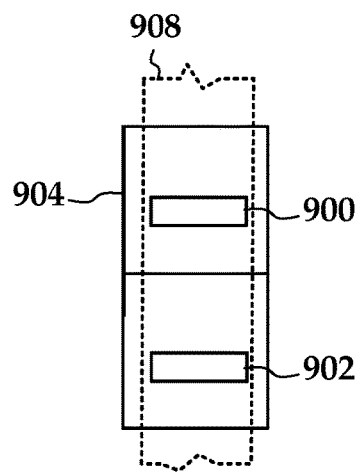

In the examples shown in FIGS. 7 and 8, separate, independent write transducers were shown that were displaced from one another in a cross track direction. In the diagram shown in FIG. 9, a parallel write arrangement according to an example embodiment may include write transducers 900, 902 offset in a downtrack direction from one another. The write transducers 900, 902 may be also offset somewhat in the cross track direction, and microactuators may be used to adjust a cross track and/or downtrack displacement between the write transducers 900, 902. Under the proper conditions, one of the write transducers 900, 902 may be able to erase or condition a current track 908 just before another of the write transducers 900, 902 writes data to the current track 908.

Figure 10:
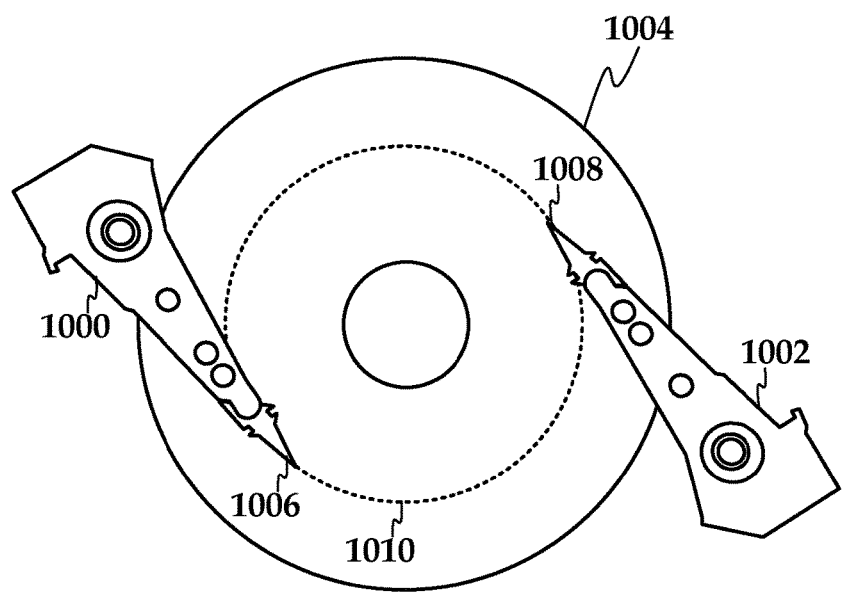
FIG. 10 is a diagram of a multiple actuator drive according to an example embodiment.

In FIG. 10, a diagram shows another example of a parallel writing architecture according to an example embodiment. Two actuator arms 1000, 1002 are simultaneously an independently movable over a disk 1004. Each of the actuator arms 1000, 1002 has at least one respective recording head 1006, 1008, each recording head 1006, 1008 having at least one write transducer. Generally, one of the recording heads 1006, 1008 can perform erase and/or precondition on a current or next track while other of the recording heads 1006, 1008 is writing data, similar to previous embodiments described above. In this example, the recording heads 1006, 1008 are separated by a partial disk rotation (e.g., half rotation), thus the timing between the signals sent to the heads 1006, 1008 would be adjusted accordingly.

Note that in the embodiments described above that use two different write transducers for erase/preconditioning and data writing, the transducers may be substantially the same, and be used interchangeably for either purpose. In other embodiments, the transducers can be different such that they are optimized for respective data writing and erase/preconditioning. For example, transducers optimized for erase/preconditioning can be wider than the transducer used for data writing (e.g., erasing a two or more tracks at once) and/or be designed to provide a much stronger magnetic field to the disk than the data writing transducer. However, even where the two transducers are different, they may still be able to perform both functions in some scenarios, e.g., where a subset of the tracks are double width, shingled tracks, etc.

Figure 11:
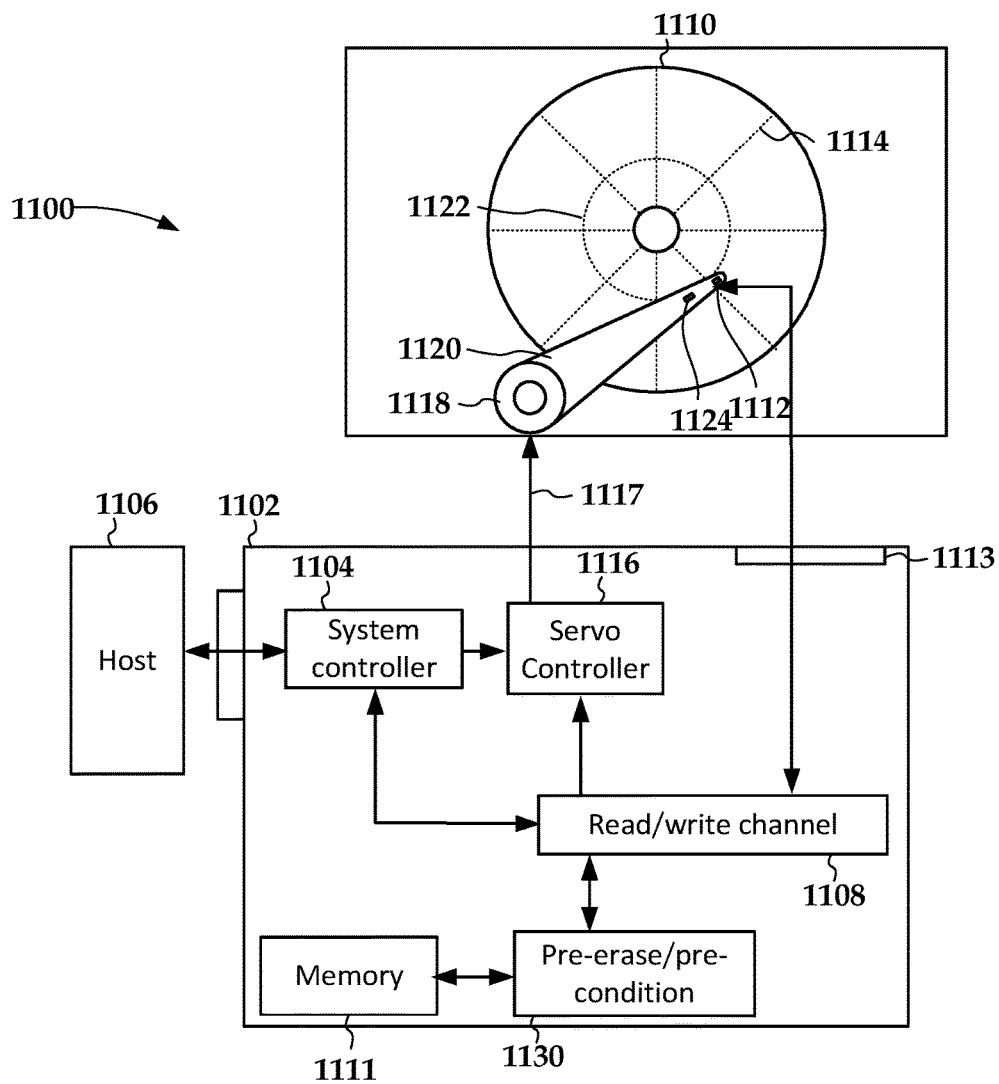
FIG. 11 is a block diagram of an apparatus according to an example embodiment.

In FIG. 11, a diagram illustrates components of a storage drive apparatus 1100 that utilizes one or more read/write heads 1112 according to example embodiments. The apparatus includes circuitry 1102 such as a system controller 1104 that processes read and write commands and associated data from a host device 1106. The host device 1106 may include any electronic device that can be communicatively coupled to store and retrieve data from a data storage device, e.g., a computer. The system controller 1104 is coupled to a read/write channel 1108 that reads from and writes to surfaces of one or more magnetic hard disks 1110.

The read/write channel 1108 generally converts data between the digital signals processed by the system controller 1104. The read/write head 1112 includes at least one write transducer and a read transducer. The read/write channel 1108 may include analog and digital circuitry such as decoders, timing-correction units, error correction units, etc. The read/write channel is coupled to the heads via interface circuitry 1113 that may include preamplifiers, filters, digital-to-analog converters, analog-to-digital converters, etc.

In addition to processing user data, the read/write channel 1108 reads servo data from servo wedges 1114 on the magnetic disk 1110 via the read/write head. All of the multiple readers of the read/write head may be used to read servo data, or only a subset thereof. The servo data are sent to a servo controller 1116, which uses the data to provide position control signals 1117 to a voice coil motor (VCM) actuator 1118. The VCM actuator 1118 rotates an arm 1120 upon which the read/write heads 1112 are mounted in response to the control signals 1117. The position control signals 1117 may also be sent to microactuators 1124 that individually control each of the read/write heads 1112, e.g., causing small displacements at each head.

The read/write heads 1112 have at least one write transducer, and each head 1112 may include more than one write transducer. Similarly, the arm 1120 may include more than one head or head subassembly, each having separate write transducers. The multiple heads/subassemblies may be positioned relative to each other via the same or different microactuators 1124. More than one arm 1120 and actuator 1118 may be included, each arm having a separate read/write head (e.g., as shown in FIG. 10). The heads 1112, together with the control circuitry, are configured to pre-erase or pre-condition tracks (or portions thereof, e.g., sectors) before recording data to the tracks.

An erase/precondition module 1130 is stored in memory 1111 and is operable to condition some tracks before writing to the tracks. For example, pre-erase or pre-conditioning magnetic field may be applied within at least part of a target track 1122 (and/or a track adjacent to the target track 1122) of the hard disk 1110 via a first write transducer prior to the target track being written. Subsequent to the application of the erase or preconditioning magnetic field, target user data is written to the part of the target track 1122. The erase/precondition module 1130 may also schedule the pre-erase/preconditioning during active writes and/or background operations, as well as synchronize those operations with the writes in embodiments that use multiple write transducers simultaneously. The erase/precondition module 1130 may maintain a database (e.g., in memory 1111 and/or on the disk 1110) tracking which tracks have user data written to them, and therefore may need to be pre-erased before being written to.

Figure 12:
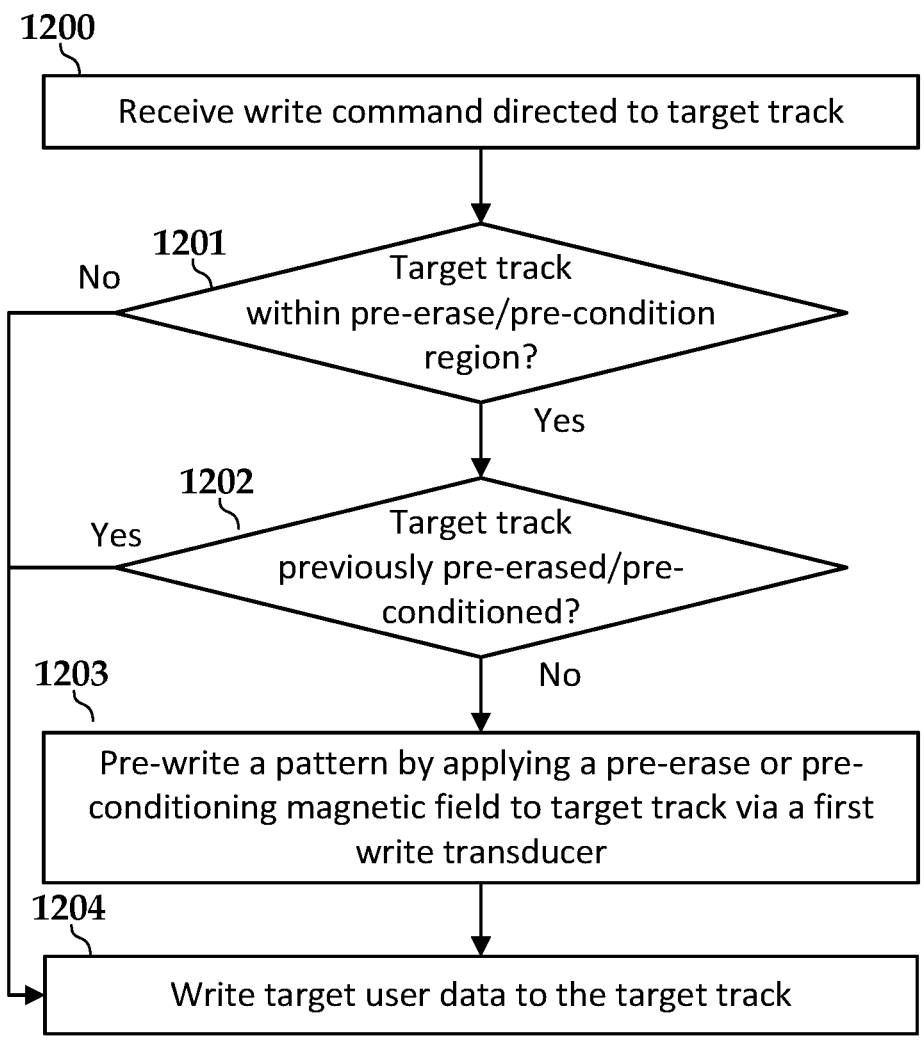
FIGS. 12 and 13 are flowcharts of methods according to example embodiments.

In reference now to FIG. 12, a flowchart illustrates a method according to an example embodiment. The method involves, in response to receiving 1200 a write command directed to a target track of a hard disk, determining 1201 whether the target track is within a pre-erase/precondition region of the hard disk. Note that this determination 1201 may be optional, in which case it may be assumed this decision always returns 'yes.' If the track is within this region, an optional determination 1202 may also be made as to whether an erase or preconditioning magnetic field was previously applied to the target track, e.g., as part of a background or factory process. If determination 1202 is optional, it may be assume to always return 'no.'

Assuming pre-erasure/pre-conditioning is currently needed, pre-writing of a pattern 1203 is performed using the erase or preconditioning magnetic field applied 1203 via a write transducer within at least part of the target track prior to the target track being written. Subsequent to the pre-writing 1203 (either during this process or from a previous process unrelated to the write request 1200), target user data is written 1204 to the part of the target track.

Figure 13:
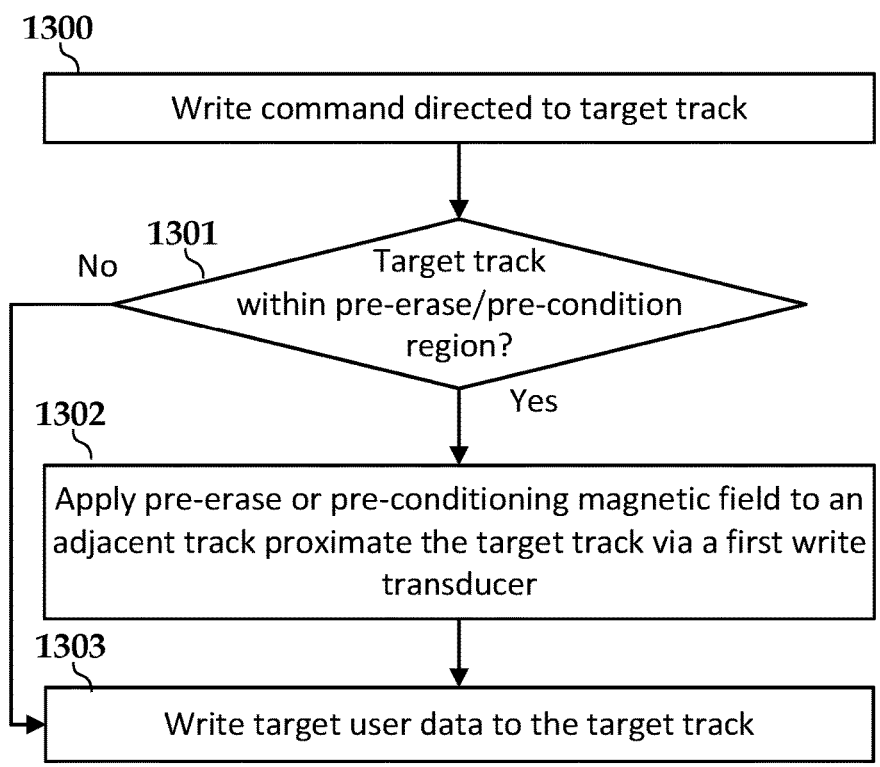

In reference now to FIG. 13, a flowchart illustrates a method according to an example embodiment. The method involves receiving 1300 a write command to write target user data to a target track a hard disk. In response to the write command, it may be determined 1301 whether the target track is within a pre-erase/precondition region of the hard disk. Note that this determination 1301 may be optional, in which case it may be assumed this decision always returns 'yes.' If pre-erasure/pre-conditioning is currently needed, an erase or preconditioning magnetic field is applied 1302 to an adjacent track proximate the target track via a first write transducer prior to the target track being written. Subsequent to the application 1302 of the erase or preconditioning magnetic field, the target user data is written 1303 to the part of the target track.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    detecting an event during field operation of a hard drive that causes at least part of a track of the hard drive to be selected for pre-erase or preconditioning;
    in response to the event, pre-writing a pattern using a pre-erase or pre-conditioning magnetic field applied within at least part of the selected track via a first write transducer prior to the selected track being written; and
    subsequent to the pre-writing, writing target user data over the pattern pre-written to the part of the selected track.

2. The system of claim 1, wherein the event comprises an idle time of the hard drive.

3. The method of claim 1, wherein the pattern comprises an AC erase pattern.

4. The method of claim 1, wherein the pre-writing comprises writing the target user data to one or more adjacent tracks proximate the selected track.

5. The method of claim 1, wherein the target user data is written to the part of the selected track via the first write transducer.

6. The method of claim 1, wherein the target user data is written to the part of the selected track via a second write transducer.

7. The method of claim 6, wherein the second write transducer is located on the same head as the first write transducer.

8. The method of claim 6, wherein the second write transducer is located on the same head-gimbal assembly as the first write transducer.

9. The method of claim 6, wherein the second write transducer is moved via a second arm different from a first arm that moves the first write transducer, the first and second arms configured to independently and simultaneously access a same surface of the hard disk.

10. The method of claim 1, wherein the selected track of the hard drive is included in a region of a disk of the hard drive susceptible to write errors due to weak fields produced by the write transducer, wherein other regions of the disk are not pre-written.

11. The method of claim 1, further comprising receiving a write command to write the target user data to the selected track, wherein the pre-writing is performed in response to the write command.

12. A method comprising:
    receiving a write command to write target user data to a target track of a hard disk;
    pre-writing a pattern using a pre-erase or pre-conditioning magnetic field applied to an adjacent track proximate the target track via a first write transducer prior to the target track being written; and subsequent to the pre-writing, writing the target user data to the part of the target track.

13. The method of claim 1, wherein the pattern comprises a copy of the target user data.

14. An apparatus comprising:
interface circuitry operable to communicate with a first write transducer of the apparatus that applies a magnetic field to a hard disk of the apparatus; and
a controller coupled to the interface circuitry and operable to:
detect an event during field operation of the apparatus that causes at least part of a track of the hard drive to be selected for pre-erase or preconditioning;
in response to the event, pre-write a pattern using a pre-erase or pre-conditioning magnetic field applied within at least part of the selected track of the hard disk via the first write transducer prior to the selected track being written; and
subsequent to the pre-writing, write target user data to the part of the selected track.

15. The apparatus of claim 14, wherein the target user data is written to the part of the selected track via the first write transducer.

16. The apparatus of claim 14, wherein the target user data is written to the part of the selected track via a second write transducer of the apparatus that is coupled to the interface circuitry.

17. The apparatus of claim 15, wherein the second write transducer is located on the same head-gimbal assembly as the first write transducer.

18. The apparatus of claim 15, wherein the second write transducer is located on a second arm of the apparatus different from a first arm that moves the first write transducer, the first and second arms operable to independently and simultaneously access a same surface of the hard disk.

19. The apparatus of claim 15, wherein the selected track of the hard disk is included in a region of the hard disk susceptible to write errors due to weak fields produced by the write transducer, wherein other regions of the disk are not pre-written before being written.

20. The method of claim 1, wherein the pre-erase or pre-conditioning magnetic field is applied over previously written user data on the part of the selected track.

21. The method of claim 1, wherein the event comprises a direct offline scan procedure.

* * * * *